(12) United States Patent
Smith, II

(10) Patent No.: US 8,500,195 B2
(45) Date of Patent: Aug. 6, 2013

(54) ADJUSTABLE SUPPORTING BRACKET FOR MOTORCYCLE BACKREST

(76) Inventor: Norman Curlalion Smith, II, Little Rock, AR (US)

(*) Notice: Subject to any disclaimer, the term of this patent is extended or adjusted under 35 U.S.C. 154(b) by 331 days.

(21) Appl. No.: 12/932,011

(22) Filed: Feb. 16, 2011

(65) Prior Publication Data

US 2012/0205950 A1  Aug. 16, 2012

(51) Int. Cl.
*B62J 1/00* (2006.01)
*B60N 2/12* (2006.01)
*B60N 2/16* (2006.01)

(52) U.S. Cl.
USPC ............ 297/215.12; 297/354.1; 297/378.1; 297/215.11

(58) Field of Classification Search
USPC ............ 297/215.12, 215.11, 353, 354.1, 297/354.12, 361.1, 378.1, 378.12, 378.14, 297/411.36, 410, 383, 411.37
See application file for complete search history.

(56) References Cited

U.S. PATENT DOCUMENTS

| | | | | |
|---|---|---|---|---|
| 1,216,029 A * | 2/1917 | Whitaker | | 297/243 |
| 1,240,587 A * | 9/1917 | Mesinger | | 297/374 |
| 1,984,549 A * | 12/1934 | Rowland | | 297/358 |
| 2,054,557 A * | 9/1936 | Cramer et al. | | 297/358 |
| 2,988,398 A * | 6/1961 | Hamilton | | 297/383 |
| 3,431,022 A * | 3/1969 | Poppe et al. | | 297/448.1 |
| 4,043,594 A * | 8/1977 | Cabell | | 297/353 |
| 4,113,221 A * | 9/1978 | Wehner | | 248/408 |
| 4,186,937 A * | 2/1980 | Schultz | | 280/304.4 |
| 4,221,430 A * | 9/1980 | Frobose | | 297/353 |
| 4,466,660 A * | 8/1984 | Mabie | | 297/215.11 |
| 4,978,167 A * | 12/1990 | Harvey | | 297/215.13 |
| 5,501,168 A * | 3/1996 | Zachary | | 114/363 |
| 5,544,937 A | 8/1996 | Hanagan | | |
| 5,730,688 A * | 3/1998 | Prusick | | 482/130 |
| 5,884,969 A * | 3/1999 | Gebhard | | 297/353 |
| 5,918,941 A * | 7/1999 | Kigel | | 297/410 |
| 5,944,387 A * | 8/1999 | Stumpf | | 297/411.37 |
| 6,007,150 A | 12/1999 | Clerkin et al. | | |
| 6,224,081 B1 | 5/2001 | Wayman et al. | | |

(Continued)

OTHER PUBLICATIONS

Website, www.utpr.com, Utopia Products—Motorcycle Backrest, Utopia Products, Inc., 10 pages, Printed from website Nov. 23, 2010.

(Continued)

*Primary Examiner* — David Dunn
*Assistant Examiner* — Richard Lowry
(74) *Attorney, Agent, or Firm* — Richard Blakely Glasgow

(57) ABSTRACT

An adjustable supporting bracket for a motorcycle backrest that may be disposed between a mounting bracket affixed to a motorcycle seat and a mounting bracket affixed to a backrest pad. The adjustable supporting bracket comprises an outer member and an inner member slidingly received within the outer member. The inner member has a hand retractable spring plunger whose tip is disposed to engage longitudinally arrayed recesses in the outer member in order to lockably fix the extension of the inner member. One of the outer member and the inner member is also provided with a tilt wheel disposed within a transverse slot in a lower portion of the member. The tilt wheel is threaded to receive a set screw that extends through the lower portion of the member to bear against the seat mounting bracket. The tilt wheel may be manually rotated to extend and retract the set screw, thereby allowing the user to determine the extent of backward travel of the backrest.

14 Claims, 6 Drawing Sheets

U.S. PATENT DOCUMENTS

| | | | |
|---|---|---|---|
| 6,354,664 B1 * | 3/2002 | Chen | 297/353 |
| 6,409,266 B1 * | 6/2002 | Chen | 297/411.37 |
| 6,422,648 B1 | 7/2002 | Hanagan | |
| 6,520,578 B1 * | 2/2003 | Jospa et al. | 297/217.1 |
| 6,568,699 B2 * | 5/2003 | McCann | 280/304.4 |
| 6,761,401 B1 * | 7/2004 | McGlynn | 297/215.12 |
| 6,983,992 B2 | 1/2006 | Oomori | |
| 7,077,470 B1 * | 7/2006 | Strother | 297/215.12 |
| 7,243,997 B1 * | 7/2007 | Tornero | 297/411.37 |
| 7,318,624 B2 | 1/2008 | Stahel et al. | |
| 7,661,761 B1 | 2/2010 | Ortega | |
| 2002/0011745 A1 * | 1/2002 | Petersen | 297/215.11 |
| 2008/0084097 A1 * | 4/2008 | Botting | 297/215.12 |

OTHER PUBLICATIONS

Mustang Cruiser Seats 2010, Issue 1, Mustang Motorcycle Products, Inc., Terryville CT, 4 pages, Copyright date 2009.

* cited by examiner

ADJUSTABLE SUPPORTING BRACKET FOR MOTORCYCLE BACKREST

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to an adjustable supporting bracket for a motorcycle driver backrest, and in particular, to such a bracket that may be adjusted without the use of tools.

2. Brief Description of the Related Art

The Utopia Built-In Driver Backrest (made by Utopia Products, Inc., www.utpr.com) is an aftermarket product designed to be installed on a stock motorcycle seat. Variations of the Utopia Built-In Driver Backrest allow it to be mounted to various commonly available models of motorcycles. The Utopia Built-In Driver Backrest typically comprises the backrest pad, a bar supporting the backrest pad and pivotally attached to the backrest pad by means of a transverse tube at the top of the bar, and seat mounting hardware to mount the backrest to the seat base of the various motorcycle models. The seat mounting hardware attaches to the seat base, which typically is made of metal, fiberglass or polyethylene and therefore provides a sturdy point of attachment to the motorcycle seat. The seat mounting hardware includes a transverse tube protruding above the upper surface of the seat to allow the bar supporting the backrest pad to be pivotally mounted to the seat; the remainder of the seat mounting hardware is not exposed. The bar has two components that are fastened together with bolts through any of a series of longitudinally-arrayed openings (the openings on one of the components are threaded) so that the two components of the bar may be fixed at a selected overall length of the bar in order to support the backrest pad at a height selected by the user. Although the bar is pivotally attached to the transverse tube of the mounting hardware, the backrest is only allowed to move freely in the forward direction in order to allow the backrest to be folded against the driver's seat. However, the backrest can only be folded against the seat when the two components of the bar are bolted together at one of the most extended positions. A set screw is used to set the amount of backward travel allowed to the backrest so that the user can employ a tool to adjust the angle of the backrest to the most comfortable tilt. While the Utopia Built-In Driver Backrest allows the height and the backward travel angle of the backrest pad to be adjusted, tools are required to perform the adjustments.

A Built-In Removable Driver Backrest available from Mustang Motorcycle Products, Inc., Terryville Conn. allows height adjustment or removal of the backrest from the motorcycle without the use of tools. However, the height adjustment is by means of a ball-type detent. Such a detent allows manual adjustment of the backrest height from one position to another, but does not provide positive locking of the backrest in a particular position. Mustang seats are replacement seats and the backrest must be ordered with the replacement seat. It is understood therefore that such a backrest is only available for the Mustang seat and not for use with other seats.

BRIEF SUMMARY OF THE INVENTION

The present invention is directed to an apparatus that satisfies the need for an adjustable supporting bracket for a motorcycle driver backrest that provides positive locking but may be adjusted without the use of tools. The adjustable supporting bracket of the present invention may be used as a replacement for the bar of the Utopia Built-In Driver Backrest as described above or for similar motorcycle driver backrest supporting brackets or bars where only the transverse tube of the mounting hardware is exposed. The present invention may also be used with other types of motorcycle backrests where the mounting hardware is designed differently than the mounting hardware of the Utopia Built-In Driver Backrest.

The adjustable supporting bracket of the present invention is disposed between a mounting bracket affixed to a portion of a motorcycle, such as the seat, seat handles, frame, etc., and a mounting bracket affixed to a backrest pad. The adjustable bracket comprises a outer member and an inner member. The inner member is slidingly received into the outer member. The inner member is provided with a hand retractable spring plunger. The tip of the plunger may engage any of a number of longitudinally arrayed recesses in the outer member in order to fix the extension of the inner member at a particular point with respect to the outer member and thus set the height of a backrest pad for the comfort of the driver. In one embodiment of the present invention specific to the Utopia Built-In Driver Backrest, the motorcycle driver backrest pad is pivotally attached to the inner member by means of a bolt received into a transverse bore at an upper end of the inner member. Likewise, in an embodiment specific to the Utopia Built-In Driver Backrest, the outer member is provided with pair of downwardly extending mounting ears for pivotally attaching the outer member to a seat mounting bracket affixed to the motorcycle seat having a transverse tube to receive a bolt. Other embodiments of the present invention may have other types of backrest pad attachment points for attaching the inner member to other designs of backrest pads and/or backrest pad mounting hardware and other types of seat attachment points for attaching the outer member to other designs of motorcycle seats and/or seat mounting hardware. In further embodiments, the outer member may be attached to the backrest pad and/or backrest pad mounting hardware and the inner member may be attached to the motorcycle seat and/or seat mounting hardware.

In one embodiment, the member attached to the seat mounting hardware is provided with a tilt wheel disposed within a transverse slot in a lower portion of the outer member. The tilt wheel is threaded to receive a set screw that extends in a longitudinal bore through the lower portion of the member to bear against the seat mounting bracket. The tilt wheel may be manually rotated to extend and retract the set screw, thereby allowing the user to determine the extent of backward travel of the member. The adjustable bracket of the present invention therefore allows the user to manually adjust both the height of the backrest pad and the tilt of the backrest without recourse to tools.

These and other features, objects and advantages of the present invention will become better understood from a consideration of the following detailed description of the preferred embodiments and appended claims in conjunction with the drawings as described following.

DETAILED DESCRIPTION OF THE INVENTION

Figure 1:
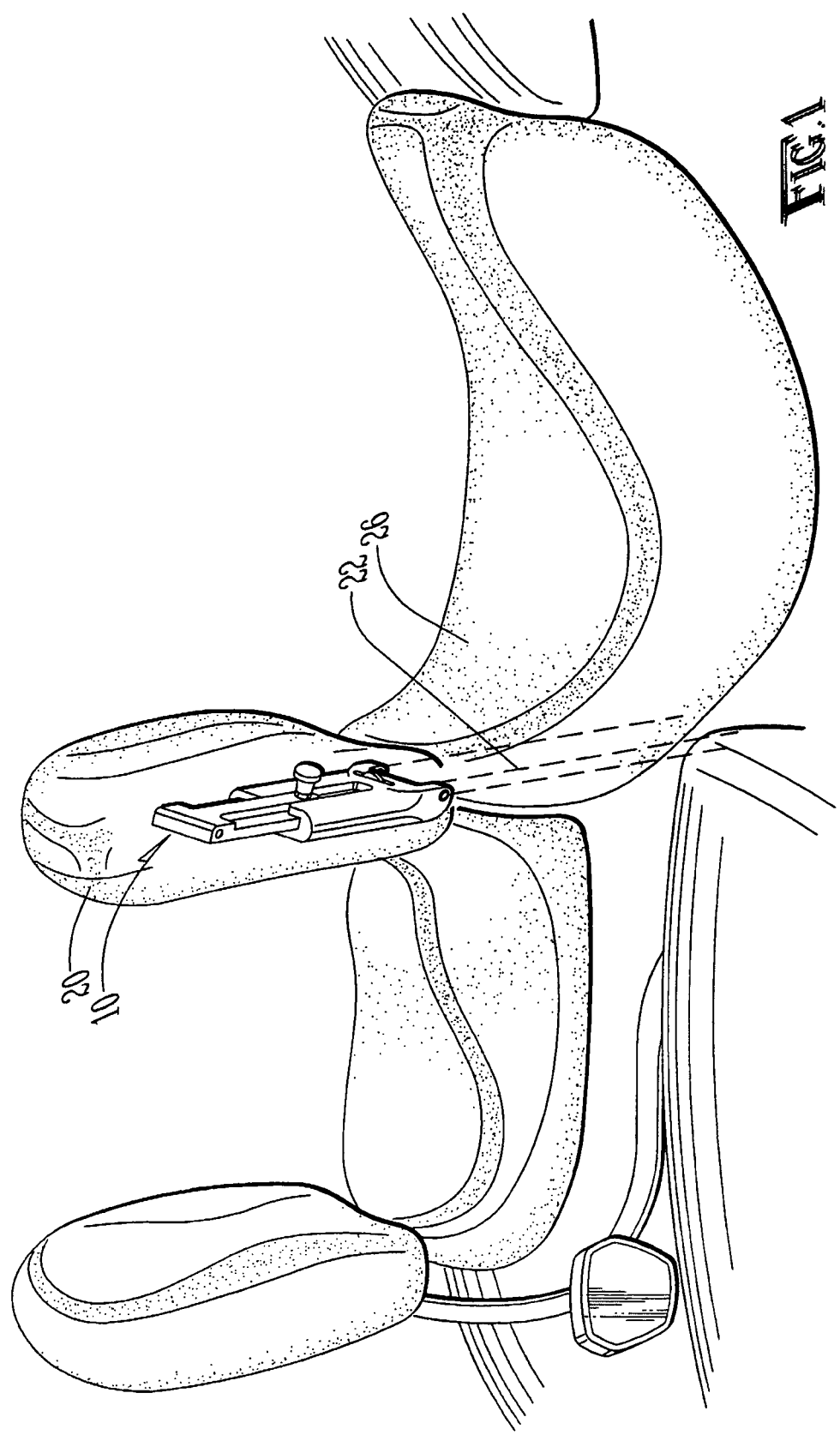
FIG. 1 is a perspective view from the right side of a motorcycle seat cut away to show an embodiment of the adjustable supporting bracket of the present invention pivotally installed to a seat mounting bracket.
Figure 2:
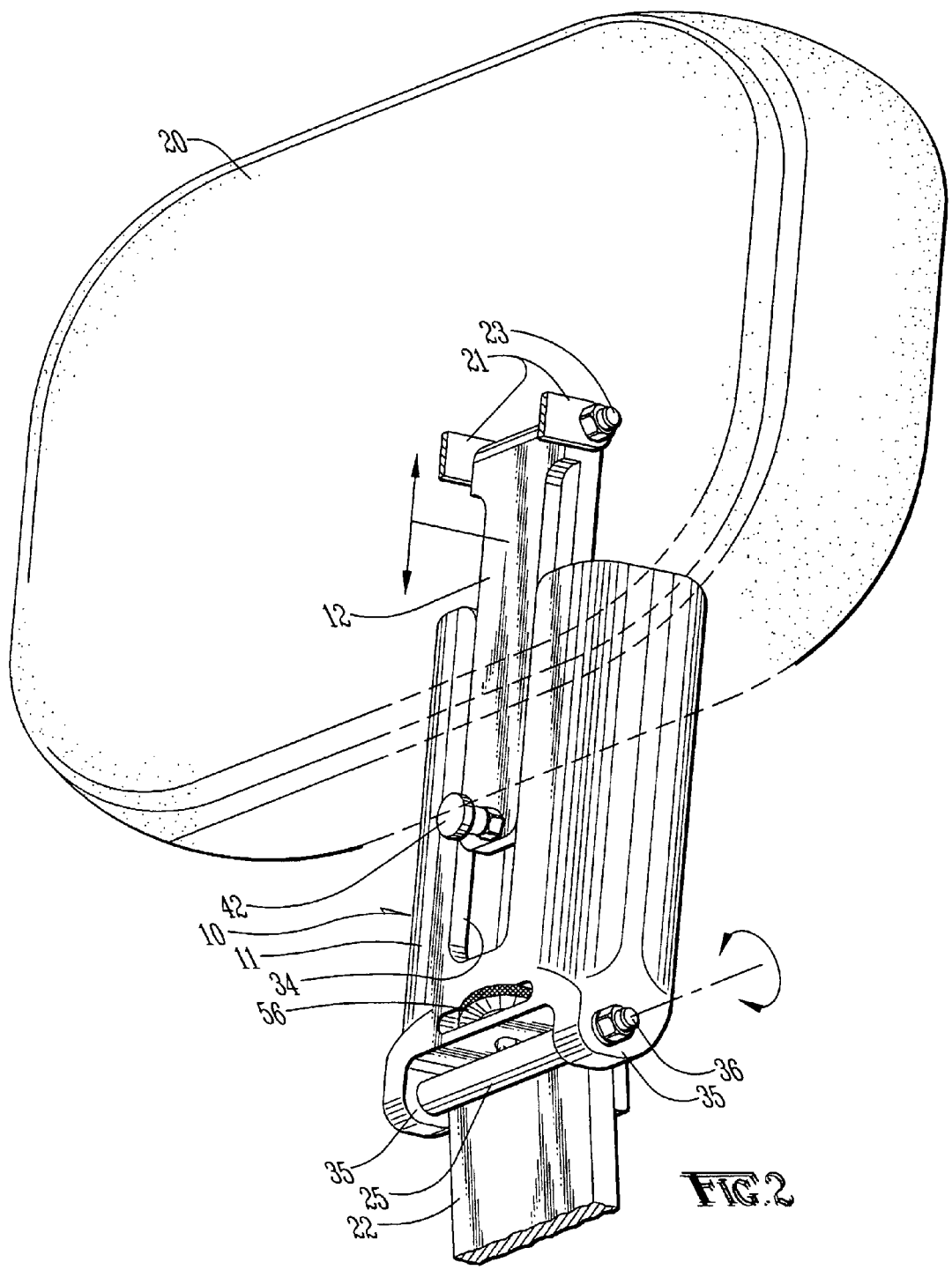
FIG. 2 is a perspective view from the left front of the embodiment of FIG. 1 showing the adjustable supporting bracket of the present invention pivotally installed to a seat mounting bracket and pivotally installed to a backrest mounting bracket.
Figure 3:
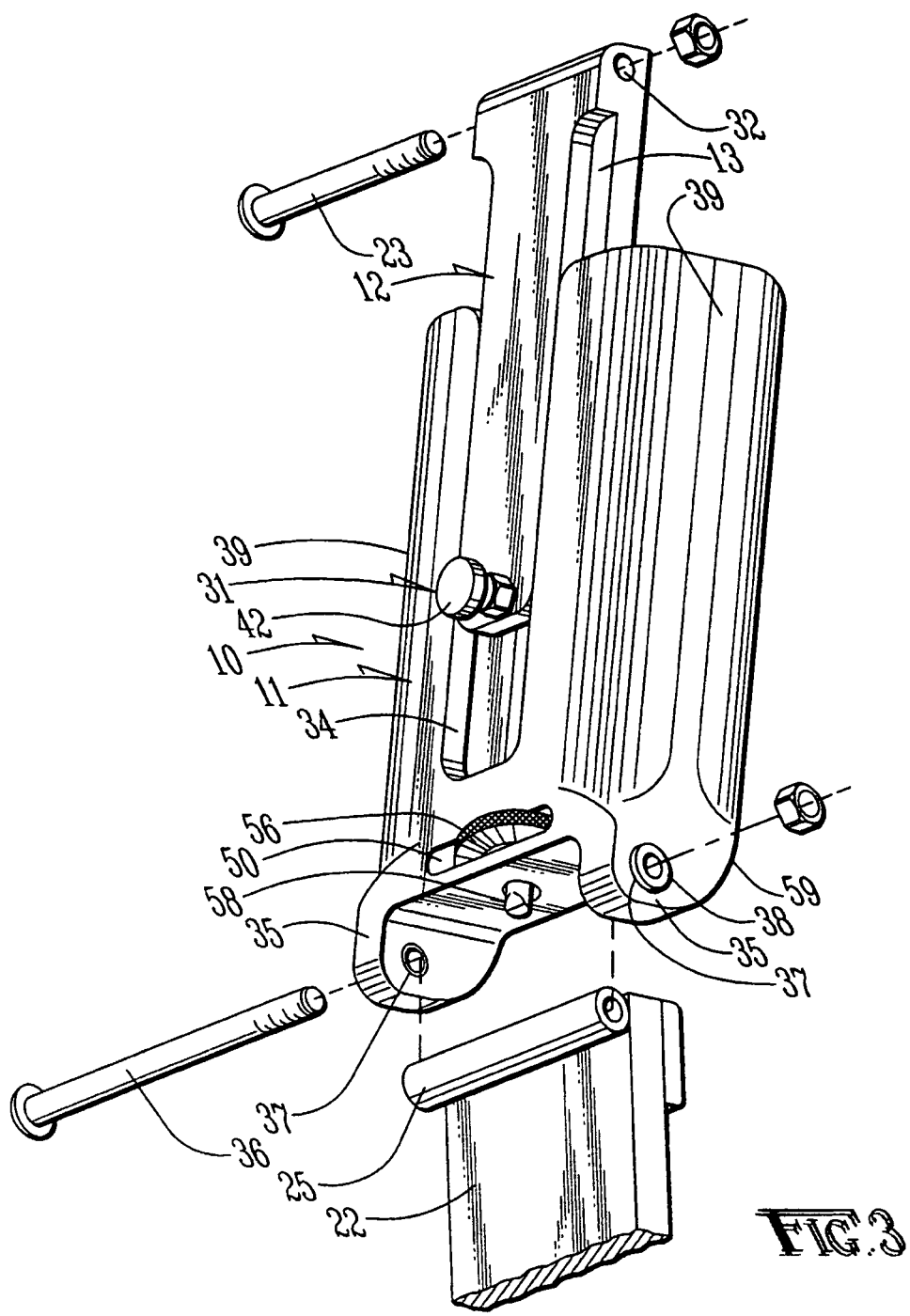
FIG. 3 is an exploded view of the embodiment of FIG. 2.
Figure 4:
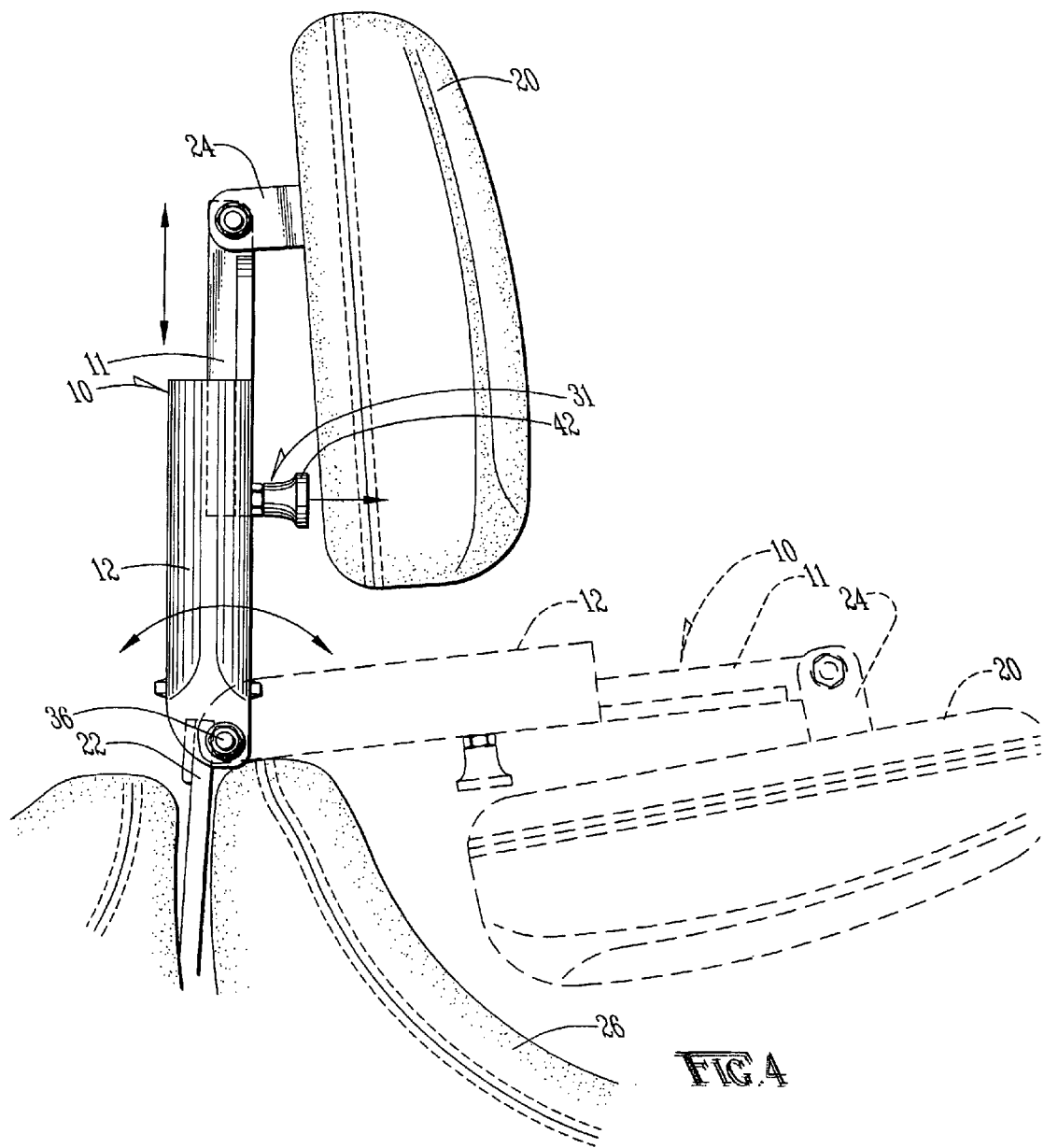
FIG. 4 is a right side elevation view of the embodiment of FIGS. 1-3 showing the seat backrest in an upright position and in phantom view in a folded position against the driver's seat.
Figure 5:
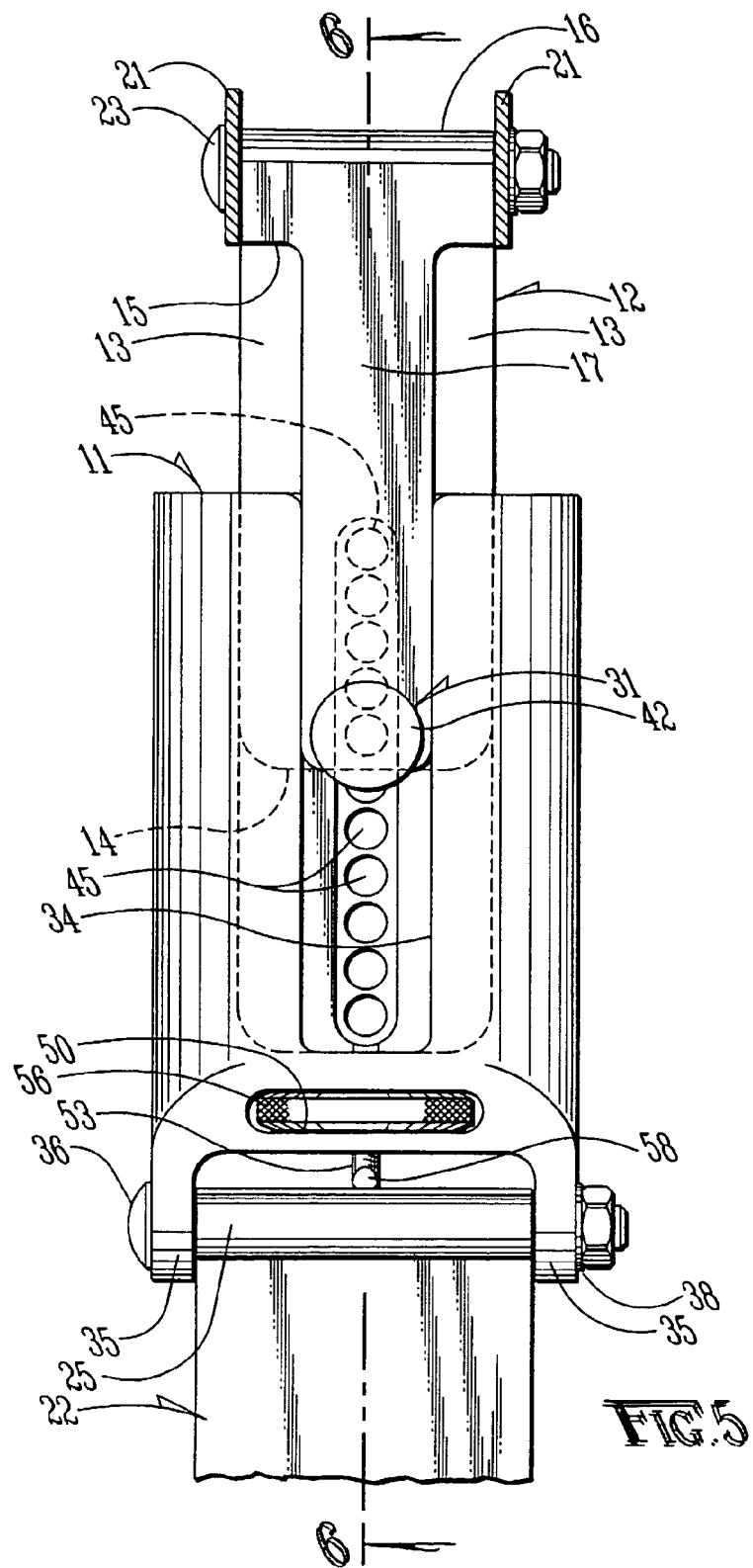
FIG. 5 is a front elevation view of the embodiment of FIGS. 1-4.
Figure 6:
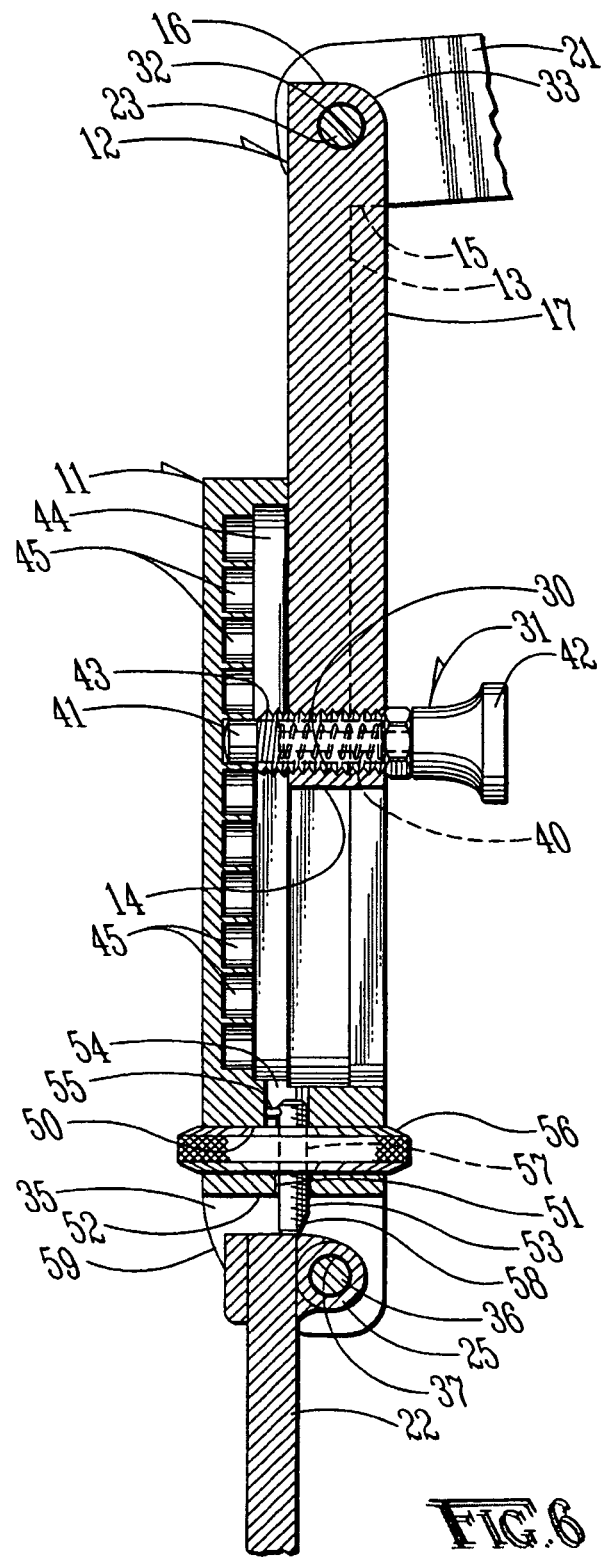
FIG. 6 is right side elevation view of the embodiment of FIGS. 1-5 in cross-section taken along the line 6-6 of FIG. 5.

With reference to FIGS. 1-6, the presently preferred embodiments of the present invention may be described.

In one preferred embodiment, the present invention may be used to provide adjustability to a driver backrest assembly made by Utopia Products, Inc., the Utopia Built-In Driver Backrest, as described in more detail above. The Utopia Built-In Driver Backrest typically comprises the driver backrest pad 20, a backrest pad mounting bracket 21, a bar (not shown) to support the backrest pad 20 and a seat mounting bracket 22 to mount the backrest to the seat base of the various motorcycle models. The bar is pivotally attached to the backrest pad by means of a bolt 23 through a transverse tube at the top of the bar and mounting ears 24 on the backrest pad mounting bracket 21. The seat mounting bracket includes a transverse tube 25 protruding above the upper surface of the seat 26 to allow the bar supporting the backrest pad 20 to be pivotally mounted to the seat 26. The present invention is described with reference to embodiments that are specifically adapted to the Utopia Built-In Driver Backrest, but the present invention is not limited to such embodiments. The attachment points by which the manually adjustable supporting bracket 10 of the present invention are attached to a backrest pad 20 or to a motorcycle seat 26 may differ from the embodiment described herein as necessary to accommodate different designs of backrest pads 20, backrest pad mounting hardware, motorcycle seats 26, or motorcycle seat mounting hardware. Attachment points are considered to encompass any means associated with a backrest supporting bracket by which a backrest supporting bracket may be attached to a backrest pad 20 and/or backrest pad mounting hardware or to any portion of a motorcycle, motorcycle seat 26, and/or motorcycle seat mounting hardware. For example, and not by way of limitation, attachment points known in the art include transverse tubes and/or transverse bores in combination with mounting ears and bolts. However, any form of attachment point known to those in the art may be employed in the practice of the present invention.

In the present invention, a supporting bar that requires tools in order to make adjustments in height or tilt in motorcycle driver backrest is replaced with an adjustable supporting bracket 10 comprising an outer member 11 and an inner member 12 slidingly received within the outer member 11.

The inner member 12 is a block having a pair of stopped rabbets 13 on opposing forward outer corners. The stopped rabbets 13 extend from the foot 14 of the inner member 12 to a point 15 short of the head 16 of the inner member 12. The stopped rabbets 13 thus define a T-shaped forward surface 17 of the inner member 12 and a T-shaped cross-section. A threaded bore 30 extends through the foot of the T-shaped surface 17 from the forward surface to the rearward surface of the inner member 12. A spring plunger 31 mounts to the forward surface by means of the threaded bore 30 as explained more fully below. In one embodiment, a transverse bore 32 extends through the head of the inner member 12 between opposing outer surfaces. In this embodiment, a backrest pad 20 having a pad mounting bracket 21 with mounting ears 24 may be pivotally mounted to the inner member 12 by means of a bolt 23 through the transverse bore 32 and the mounting ears 24 of the backrest pad mounting bracket 21. However, other means for mounting the backrest pad 20 may be used to accommodate other designs of backrest pads and backrest pad mounting hardware. To allow the backrest pad to pivot around the mounting point as the bracket 10 tilts and folds, it is desirable that the upper forward edge 33 of the inner member 12 be rounded.

The outer member 11 is a block with a corresponding T-shaped slot 34 to slidingly receive the T-shaped cross section of the inner member 12. While the inner member 12 must be freely slidable in the outer member 11, it is desirable that the inner member 11 fit snugly within the outer member 12 with minimal forward-and-backward or transverse play between the two members. In one embodiment, a pair of mounting ears 35 extend downwardly from the foot of the outer member 11 to allow pivotal attachment of the outer member 11 to a seat mounting bracket of the type having a transverse tube 25 to receive a bolt 36. The mounting ears 35 have transverse bores 37 which are set forwardly of the centerline of the outer member 11. In one embodiment of the present invention, the left mounting ear may have a larger diameter than the right mounting ear to accommodate a sliding nylon bushing 38 for mounting to the seat hardware and to provide a degree of friction against the seat mounting hardware as desirable for proper tilting. The sliding nylon bushing 38 is also desirable to prevent too much force being placed onto the mounting ears 35 when tightening the bolt 36 to hold the mounting ears 35 to the transverse tube 25 of the seat mounting hardware. The nylon bushing 38 might not be required if the attachment point on the adjustable bracket 10 comprises a transverse bore or other attachment means rather than mounting ears on the adjustable bracket 10.

The mounting ears 35 are spaced to receive the transverse tube 25 of the seat mounting hardware. The outer member 11 may thus be pivotally mounted to the seat mounting hardware by means of the bolt 36 extending through the mounting ears 35 and the transverse tube 25. In other forms of seat mounting hardware, other embodiments of the present invention may include other means for pivotal attachment to the seat mounting hardware. It is desirable that the sides 39 of the outer member 11 above the mounting ears 35 be rounded to avoid the possibility of the driver or passenger coming into contact with sharp edges.

As mentioned above, a spring plunger 31 is mounted to the forward surface of the inner member 12 by means of the threaded bore 30 in the inner member 12. The hand retractable spring plunger 31 is of a type commonly available for applications as positioners, locating pins and indexing devices. Such hand retractable spring plungers 31 typically comprise a threaded body which includes a hex head for ease in fastening the threaded body into a threaded opening. A spring biased plunger 40 is disposed within the threaded body and a tip 41 of the plunger 40 extends beyond the end of the threaded body opposite to the hex head. A knob 42 attached to the plunger 40 is disposed at the end of the threaded body adjacent to the hex head. The knob 42 is employed manually to withdraw the tip 41 of the plunger 40 into the threaded body against the spring bias. When the knob 42 is released, the tip 41 of the plunger 40 extends beyond the end of the threaded body and is held in an extended position by the bias of the spring. Suitable hand retractable spring plungers are available from a number of suppliers, including McMaster-Carr Part No. 3350A29 (McMaster-Carr, 200 New Canton Way, Robbinsville, N.J., 08691-2343, www.mcmaster.com), S&W Part No. SDKN38 (S&W Manufacturing, 216 Evergreen St., Bensenville, Ill. 60106, www.swmanufacturing.com) and Reid Part No. PRT-21 (Reid Supply Company, 2265 Black Creek Road, Muskegon, Mich. 49444-2684, www.reidsupply.com).

The length of the threaded body of the spring plunger 31 is selected so that when the spring plunger 31 is threaded into the threaded bore 30, a portion 43 of the threaded body extends beyond the rearward surface of the inner member 12. A longitudinal stopped dado 44 is disposed in the T-shaped slot of the outer member 11. The stopped dado 44 is closed at its upper end and does not extend through the head of the outer member 11. The longitudinal stopped dado 44 receives the extended portion 43 of the threaded body of the spring plunger 31. The inner member 12 is thus able to slide freely within the T-shaped slot 34 and the extended portion 43 of the threaded body is also able to ride freely along the longitudinal stopped dado 44, but the inner member 12 is prevented from separating completely from the outer member 11 by the limits imposed by the closed upper end of the longitudinal stopped dado 44.

The longitudinal stopped dado 44 is further provided with a longitudinal array of recesses 45. The recesses 45 preferably have sides that are perpendicular to the rearward surface of the outer member 11. Likewise, the extendable tip 41 of the spring plunger 31 has sides that are parallel to the direction of travel of the plunger 40. The extendable tip 41 of the spring plunger 31 engages into any one of the longitudinal array of recesses 45 which therefore act as locking detents to fix the position of the inner member 12 at a plurality of positions with respect to the outer member 11. "Lockable" is intended to refer to a degree of fixation of the extended tip 41 of the plunger 31 with respect to any one of the recesses 45 such that the inner member 12 cannot be moved with respect to the outer member 11 by manually pulling or pushing on either the inner member 12 or the outer member 11 without first retracting the tip 41 of the spring plunger 31 from the recess 45. Thus the user may manually retract the knob 42 of the spring plunger 31, slide the inner member 12 to a desired position corresponding to a desired height of the attached backrest pad 20, and release the spring plunger 31 to allow the tip 41 of the plunger 40 to engage the nearest recess 45 and thus fix the inner member 12 at the desired height without the needs for tools.

A transverse slot 50 extends completely through a lower portion of the outer member 11 just above the downwardly extending mounting ears 35. A central longitudinal bore 51 extends from a bottom surface 52 of the outer member 11 through the lower portion of the outer member 11. The longitudinal bore 51 is sized to receive a threaded set screw 53 that is allowed to move freely in a longitudinal direction. The longitudinal bore 51 is also provided with a longitudinal slot 54. The set screw 53 has a roll pin 55 projecting transversely from an upper portion. Suitable roll pins are available off-the-shelf, for example, McMaster-Carr Part No. 92373A174. The roll pin 55 rides along the longitudinal slot 54 of the longitudinal bore 51 so that the set screw 53 is freely movable longitudinally but cannot rotate.

A tilt wheel 56 having a threaded central bore 57 is disposed within the transverse slot 50 and the set screw 53 is threadedly received in the central bore 57. The tilt wheel 56 desirably protrudes beyond the forward and rearward surfaces of the outer member 11 sufficiently to allow the user to manually operate the tilt wheel 56 but should protrude no more than necessary to minimize any safety hazard to the driver or passenger. The user may manually operate the tilt wheel 56 without the use of tools to move the set screw 53 longitudinally in the longitudinal bore 51 and determine the distance that the set screw 53 protrudes beyond the bottom surface 52 of the outer member 11. The tilt wheel 56, set screw 53 and longitudinal bore 51 are disposed so that the tip of the set screw 53 bears against a rearward portion of the seat mounting bracket 22: i.e., rearward of the pivot point between the outer member 11 and the seat mounting bracket 22. As described above, the bores 37 in the mounting ears 35 are set forwardly of the centerline of the outer member 11 thus establishing a pivot point of the outer member 11 that is set forwardly of the centerline of the outer member 11. However, the longitudinal bore 51 within which the set screw 53 moves is centered within the outer member 11. Since the outer member 11 is pivotally attached to the seat mounting bracket 22, the position of the set screw 53 determines the amount of backward travel allowed to the outer member 11 and therefore the entire backrest assembly. The transverse bores 37 in the mounting ears 35 of the outer member 11 are disposed so that when the set screw 53 is completely withdrawn into the outer member 11, the bottom surface 52 of the outer member 11 rests on a rearward portion of the seat mounting bracket 22 when tilted completely rearwardly. The set screw 53 is disposed so as to clear the seat mounting hardware when the backrest assembly is pivoted forwardly. The set screw 53 has an angled tip 58 to allow for pivotal clearance over the transverse tube 25 of the seat mounting bracket 22 even if the set screw 53 is fully extended. The length of the set screw 53 is determined so that it extends just short of interfering with forward folding of the backrest assembly and short enough to fully retract without interfering with the inner member 12. Since the set screw 53 bears against a rearward portion of the seat mounting bracket 22, the entire backrest assembly may pivot freely forwardly despite the setting of the set screw 53. In its fully extended position, the backrest assembly may therefore be laid flat against the driver's seat if desired to allow a passenger more freedom to mount or dismount from the motorcycle without interference from the backrest assembly. It is desirable that the rearward portion 59 of the mounting ears 35 on the outer member 11 be rounded for safety reasons when the backrest is tilted forwardly.

The preferred embodiments are described above with reference to an adjustable bracket in which the outer member 11 is attached to the seat mounting hardware 22 and the inner member 12 is attached to the backrest pad bracket 21. However, in alternative embodiments, the two may be reversed with the outer member 11 attached to the backrest pad bracket 21 and the inner member 12 attached to the seat mounting hardware 22. In these embodiments, the tilt wheel 56 and set screw 53 may comprise elements of the inner member 12, but the structure, function and operation of the tilt wheel 56 and set screw 53 would be substantially the same as described above with respect to the outer member 11.

In order to adjust the position of the backrest pad 20, the driver may reach under the backrest pad 20 and grasp the knob 42 of the retractable spring plunger 31 between the middle and ring fingers of the hand. In this position, the backrest pad 20 is resting in the palm of the driver's hand. The retractable spring plunger 31 may be retracted by the driver squeezing the pad and thus pulling the retractable spring plunger 31 forward. The backrest pad 20 is then released into the driver's hand thereby allowing the pad 20 to be repositioned as desired. The spring plunger 31 is then released to lock the tip 41 of the plunger into one of the recesses 45. In order to facilitate these motions, it is desirable that the knob 42 of the spring plunger 31 be centrally located from side-to-side on the adjustable bracket 10 so that adjustment of the height of the backrest pad 20 can be made without excessive side-to-side motion.

The present invention has been described with reference to certain preferred and alternative embodiments that are intended to be exemplary only and not limiting to the full scope of the present invention as set forth in the appended claims. The invention has been described with reference to an embodiment that is particularly adapted to the Utopia Built-In Driver Backrest, but the invention is not limited to this specific style of motorcycle backrest.

What is claimed is:

1. An adjustable supporting bracket for a motorcycle driver backrest, comprising:
   an outer member, said outer member comprising a plurality of longitudinally arrayed recesses;
   an inner member slidingly received within said outer member, said inner member comprising a hand retractable spring plunger and said hand retractable spring plunger comprising a tip disposed for releasably engaging any one of said recesses, whereby said inner member is fixed in position in relation to said outer member, wherein said inner member comprises a block with a pair of stopped rabbets on opposing forward outer corners, said stopped rabbets defining a T-shaped forward surface and a T-shaped cross-section of said inner member; and
   a tilt wheel disposed within a transverse slot in one of said outer member and said inner member, said tilt wheel having a threaded central bore for threadedly receiving a set screw disposed within a longitudinal bore in said one of said outer member and said inner member, said set screw freely movable in a longitudinal direction without rotation.

2. The adjustable supporting bracket of claim 1, wherein outer member further comprises a closed end longitudinal stopped dado and said spring plunger further comprises an extended portion disposed so as to ride in said closed end longitudinal stopped dado.

3. The adjustable supporting bracket of claim 1, further comprising an attachment point on said outer member and an attachment point on said inner member.

4. The adjustable supporting bracket of claim 1 wherein said outer member comprises a block with a T-shaped slot corresponding to said T-shaped forward surface and said T-shaped cross-section of said inner member to slidingly receive said inner member.

5. An adjustable supporting bracket for a motorcycle driver backrest, comprising:
   an outer member, said outer member comprising a plurality of longitudinally arrayed recesses;
   an inner member slidingly received within said outer member, said inner member comprising a hand retractable spring plunger and said hand retractable spring plunger comprising a tip disposed for releasably engaging any one of said recesses, whereby said inner member is fixed in position in relation to said outer member, wherein said inner member comprises a block with a pair of stopped rabbets on opposing forward outer corners, said stopped rabbets extending from a foot of said inner member to a point short of a head of said inner member to define a T-shaped forward surface and a T-shaped cross-section of said inner member;
   said inner member comprising a backrest pad attachment point;
   said outer member comprising a seat attachment point; and
   a tilt wheel disposed within a transverse slot in a lower portion of said outer member, said tilt wheel having a threaded central bore for threadedly receiving a set screw disposed within a longitudinal bore in said lower portion of said outer member, said set screw freely movable in a longitudinal direction without rotation.

6. The adjustable supporting bracket of claim 5, wherein said outer member further comprises a closed end longitudinal stopped dado and said spring plunger further comprises an extended portion disposed so as to ride in said closed end longitudinal stopped dado.

7. The adjustable supporting bracket of claim 5, wherein said backrest pad attachment point comprises a transverse bore in an upper portion of said inner member.

8. The adjustable supporting bracket of claim 5, wherein said seat attachment point comprises a pair of downwardly extending mounting ears.

9. The adjustable supporting bracket assembly of claim 5 wherein outer member comprises a block with a T-shaped slot corresponding to said T-shaped forward surface and said T-shaped cross-section of said inner member to slidingly receive said inner member.

10. An adjustable supporting bracket assembly for a motorcycle driver backrest, said backrest having a backrest pad with a mounting bracket attached thereto and said motorcycle having a seat with a mounting bracket attached thereto, said backrest pad mounting bracket further having a pair of mounting ears for pivotal attachment to a supporting bracket and said seat mounting bracket further having a transverse mounting tube for pivotal attachment to a supporting bracket, said adjustable supporting bracket comprising:
   an outer member, said outer member comprising a plurality of longitudinally arrayed recesses;
   an inner member slidingly received within said outer member, said inner member comprising a hand retractable spring plunger and said hand retractable spring plunger comprising a tip disposed for releasably engaging any one of said recesses, whereby said inner member is fixed in position in relation to said outer member, wherein said inner member comprises a block with a pair of stopped rabbets on opposing forward outer corners, said stopped rabbets extending from a foot of said inner member to a point short of a head of said inner member to define a T-shaped forward surface and a T-shaped cross-section of said inner member;
   means for pivotally attaching an upper portion of said inner member to said mounting ears of said backrest pad mounting bracket;
   means for pivotally attaching a lower portion of said outer member to said transverse mounting tube of said motorcycle seat; and
   a tilt wheel disposed within a transverse slot in a lower portion of said outer member, said tilt wheel having a threaded central bore for threadedly receiving a set screw disposed within a longitudinal bore in said lower portion of said outer member to bear against said seat mounting bracket, said set screw freely movable in a longitudinal direction without rotation.

11. The adjustable supporting bracket assembly of claim 10, wherein outer member further comprises a closed end longitudinal stopped dado and said spring plunger further comprises an extended portion disposed so as to ride in said closed end longitudinal stopped dado.

12. The adjustable supporting bracket assembly of claim 10, wherein said means for pivotally attaching an upper portion of said inner member to said mounting ears of said backrest pad mounting bracket comprises a transverse bore in an upper portion of said inner member.

13. The adjustable supporting bracket assembly of claim 10, wherein said means for pivotally attaching a lower portion of said outer member to said transverse mounting tube of said motorcycle seat comprises a pair of downwardly extending mounting ears disposed to receive said transverse mounting tube of said seat mounting bracket.

14. The adjustable supporting bracket assembly of claim 10 wherein said outer member comprises a block with a T-shaped slot corresponding to said T-shaped forward surface and said T-shaped cross-section of said inner member to slidingly receive said inner member.

* * * * *